(12) United States Patent
Thor

(10) Patent No.: US 8,831,844 B2
(45) Date of Patent: Sep. 9, 2014

(54) CLUTCH RETURN SPRING PRESSURE LEARNING DURING A COASTING MANEUVER

(75) Inventor: Todd J. Thor, Byron, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 138 days.

(21) Appl. No.: 13/560,048

(22) Filed: Jul. 27, 2012

(65) Prior Publication Data

US 2014/0032063 A1    Jan. 30, 2014

(51) Int. Cl.
  *B60W 10/02*    (2006.01)

(52) U.S. Cl.
  USPC ............................................. 701/59; 701/68

(58) Field of Classification Search
  CPC .............. F16D 2500/5026; F16D 2500/50269; F16D 2500/50272; F16D 2500/5085; F16D 2500/3068; F16D 2500/3018; F16D 2500/30402; F16H 2342/02; B60W 30/18072
  USPC ................................... 701/53, 59, 68; 73/161
  See application file for complete search history.

(56) References Cited

U.S. PATENT DOCUMENTS

| | | | |
|---|---|---|---|
| 5,547,436 A * | 8/1996 | Hayabuchi et al. ............ | 477/114 |
| 5,827,153 A * | 10/1998 | Yasue et al. .................... | 477/155 |
| 5,916,058 A * | 6/1999 | Sakai et al. ..................... | 477/114 |
| 6,658,341 B2 * | 12/2003 | Inoue et al. ...................... | 701/67 |
| 7,069,767 B2 * | 7/2006 | Runde et al. .................... | 73/1.71 |
| 7,798,940 B2 * | 9/2010 | Henning ......................... | 477/174 |
| 7,938,209 B2 * | 5/2011 | Dilzer et al. ................ | 180/65.28 |
| 8,000,869 B2 * | 8/2011 | Petzold et al. ................... | 701/68 |
| 8,292,785 B2 * | 10/2012 | Walker et al. .................. | 477/176 |
| 8,577,570 B2 * | 11/2013 | Ellis ................................ | 701/67 |
| 2012/0053801 A1 * | 3/2012 | Hangen ............................ | 701/67 |
| 2012/0067690 A1 * | 3/2012 | Postic et al. ................ | 192/85.63 |
| 2012/0191310 A1 * | 7/2012 | Whitton et al. .................. | 701/68 |
| 2013/0231834 A1 * | 9/2013 | Thor ................................ | 701/68 |
| 2013/0231835 A1 * | 9/2013 | Thor ................................ | 701/68 |

FOREIGN PATENT DOCUMENTS

| | | | |
|---|---|---|---|
| DE | 19708287 A1 * | 9/1997 | ............. F16D 48/00 |
| DE | 10209086 C1 * | 10/2003 | ............. F16D 48/06 |

OTHER PUBLICATIONS

EPO machine translation of DE 10209086 (original DE document published Oct. 30, 2003).*

\* cited by examiner

*Primary Examiner* — Behrang Badii
*Assistant Examiner* — David Testardi
(74) *Attorney, Agent, or Firm* — Quinn Law Group, PLLC

(57) ABSTRACT

A method of learning the return spring pressure of a clutch in a vehicle having an engine and an automatic transmission includes selecting a clutch for analysis from a plurality of clutches of the transmission when the vehicle coasts for a predetermined duration. The method includes ramping down clutch pressure to the selected clutch until engine speed reaches idle and measuring the clutch pressure for the selected clutch after engine speed has remained at idle for a calibrated duration. An actual return spring pressure may be calculated as a function of the preliminary return spring pressure. The actual return spring pressure may be used thereafter to control a subsequent shift event of the transmission. A vehicle includes an engine, transmission, and controller configured to detect a predetermined coasting condition, and to execute code using a processor to thereby execute the above method. A system includes the transmission and controller.

20 Claims, 2 Drawing Sheets

CLUTCH RETURN SPRING PRESSURE LEARNING DURING A COASTING MANEUVER

TECHNICAL FIELD

The present disclosure relates to a method and system for learning a clutch return spring pressure in a vehicle while coasting.

BACKGROUND

The gear elements and clutches of an automatic transmission are selectively engaged and disengaged in different combinations to transfer input torque from an internal combustion engine to a transmission output member. The clutch associated with the current speed ratio is referred to as the off-going clutch, while the clutch associated with the desired post-shift speed ratio is referred to as an on-coming clutch. To properly execute an upshift or downshift maneuver, a transmission controller requires detailed knowledge of the return spring pressure for each clutch. While a calibrated return spring pressure is typically stored in memory when the vehicle is first produced, over time the actual return spring pressure may vary from the calibrated value.

SUMMARY

A method is disclosed herein that, when executed by associated hardware components of an onboard controller, enables the controller to automatically learn the return spring pressure of each of the various clutches used in an automatic transmission. When predetermined vehicle coasting conditions are present, the controller ramps down clutch pressure to a selected clutch. Pressure ramping continues until engine speed reaches idle and stabilizes.

Once engine speed has remained sufficiently stable for a calibrated duration, the controller measures the clutch pressure for the selected clutch. This pressure value is then recorded in memory as a preliminary return spring pressure value. The controller may adjust this value by extrapolating or back-calculating the actual return spring pressure, i.e., by determining the pressure at the beginning of the calibrated duration allowed for engine speed stabilization.

A vehicle is also disclosed herein that includes an engine, a transmission, and a controller. The controller includes a processor, a tangible, non-transitory memory device, and computer-executable code recorded on the memory device. The controller is configured to detect a predetermined coasting condition of the vehicle, and to execute the code using the processor in response to the detected predetermined coasting condition.

Execution of the code from the memory device causes the controller to select a clutch for analysis from the plurality of clutches, and to thereafter ramp down clutch pressure to the selected clutch until the engine speed reaches a calibrated idling speed. The controller then measures the clutch pressure to the selected clutch after the engine speed has remained at the calibrated idling speed for a calibrated duration. The measured clutch pressure is recorded in the memory device as a preliminary return spring pressure value. The controller then calculates the actual return spring pressure for the selected clutch as a function of the preliminary return spring pressure and uses the actual return spring pressure to control a shift event of the transmission.

A system is also disclosed herein that includes a transmission having a plurality of clutches, and a controller in communication with the clutches. The controller includes a processor, as well as a tangible, non-transitory memory device having a recorded set of computer-executable code. The controller detects a predetermined coasting condition of the vehicle, and executes the code in response to the detected coasting condition to thereby execute the method essentially as noted above.

The above features and advantages and other features and advantages of the present invention are readily apparent from the following detailed description of the best modes for carrying out the invention when taken in connection with the accompanying drawings.

DETAILED DESCRIPTION

Figure 1:
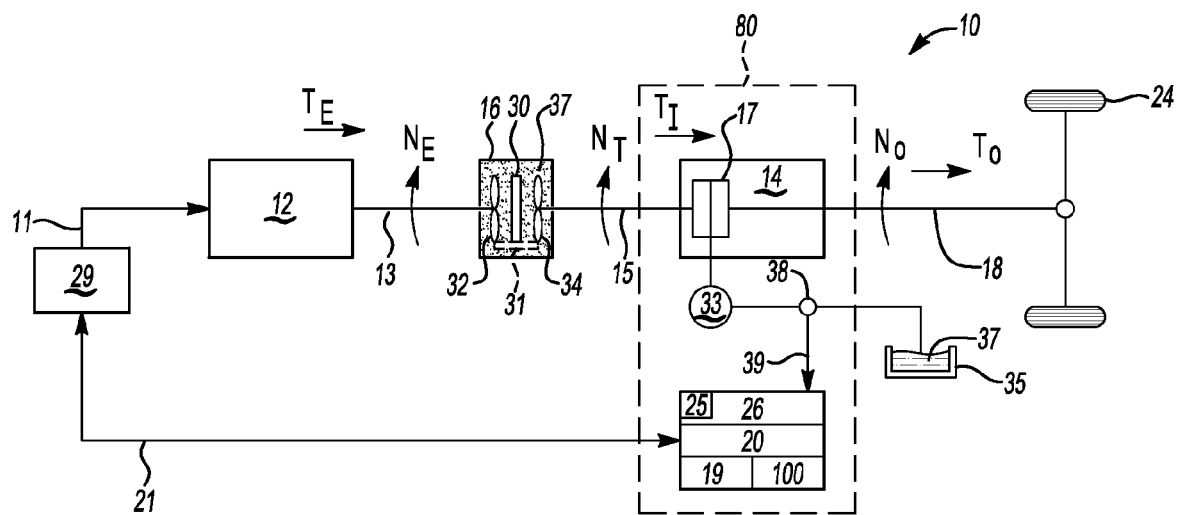
FIG. 1 is a schematic illustration of an example vehicle having an automatic transmission and a controller that learns a clutch return spring pressure during a coasting maneuver.
Figure 3:
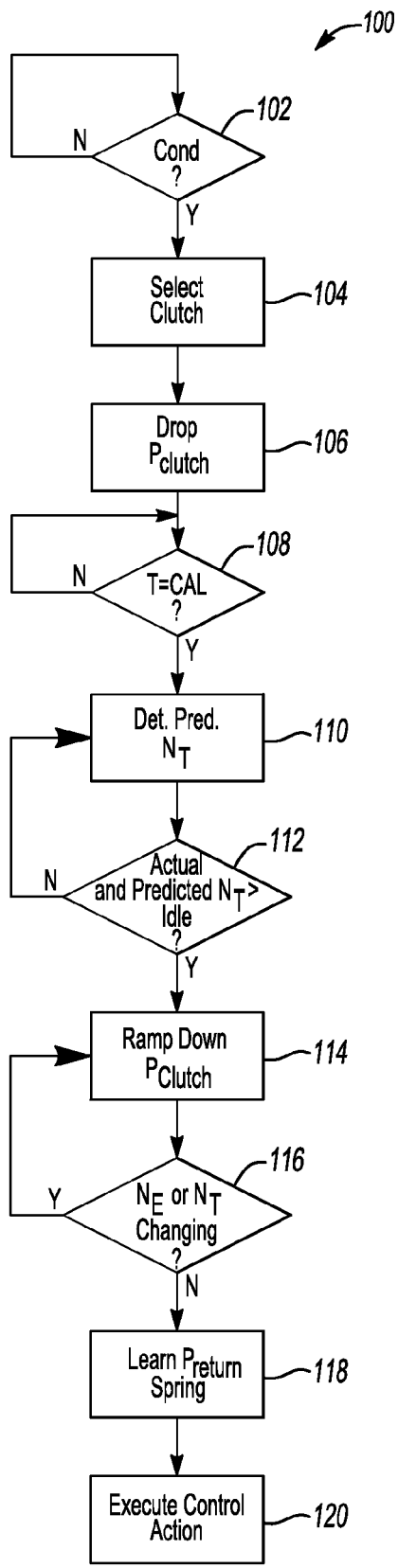
FIG. 3 is a flow chart describing an example method for learning the return spring pressure of a selected clutch within the vehicle shown in FIG. 1.

Referring to the drawings, an example vehicle 10 is shown in FIG. 1 that includes an automatic transmission 14 and a transmission controller 26. The controller 26 includes a processor 20 and tangible, non-transitory memory 19 on which is recorded computer-executable code embodying a method 100, an example of which is shown in FIG. 3 and described in detail below. Execution of the various steps of method 100 enables the controller 26 to automatically learn the return spring pressure for a selected one of a plurality of clutches 17 within the transmission 14. The present approach may conclude by adapting, as needed, various clutch fill and/or shift control commands to account for changes over time in the return spring pressure. In some instances, fuel economy may also improve due in part to the use of an effective neutral or close to neutral state during the execution of the method 100.

Memory 19 may include read only memory (ROM), electrically-programmable read-only memory (EPROM), flash memory, or any other non-transitory, computer readable media. Such memory is relatively permanent, and thus may be used to retain values needed for later access by the processor 20. All computer-readable, tangible media are thus considered herein to be non-transitory, with the sole exception being any transitory/transient propagating signals. Memory 19 may also include any required counters 25, proportional-integral-derivative (PID) control logic, one or more high-speed clocks, timers, analog-to-digital (A/D) circuitry, digital-to-analog (D/A) circuitry, a digital signal processor, and the necessary input/output (I/O) devices and other signal conditioning and/or buffer circuitry.

The vehicle 10 of FIG. 1 may include an internal combustion engine 12 or any other prime mover. A drive shaft 13 rotates at engine speed ($N_E$) and delivers engine torque ($T_E$) to a hydrodynamic torque converter 16 containing transmission fluid 37. The torque converter includes a turbine 34 connected to a transmission input shaft 15. The turbine 34 rotates to cause the connected input shaft 15 to rotate at turbine speed (arrow $N_T$). A stator 30 is positioned between an engine-driven pump 32 and the turbine 34. An optional torque converter clutch 31 may be used to selectively lock the pump 32 to the turbine 34 above a threshold lockup speed, as will be well understood by those of ordinary skill in the art. Thus, input torque ($T_I$) is delivered via the torque converter 16 to the transmission 14 via the input shaft 15. An output shaft 18 of the transmission 14 rotates at an output speed ($N_O$), and ultimately conveys transmission output torque ($T_O$) from the various clutches 17 and associated gear sets of the transmission 14 to a set of drive wheels 24.

The transmission 14 of FIG. 1, which with the controller 26 may form a system 80, may be configured as any multi-speed transmission, e.g., a 6-speed or an 8-speed transmission. Thus, the clutches 17, which include at least an off-going and an oncoming clutch for execution of a clutch-to-clutch upshift or downshift, may be selectively engaged and disengaged as needed using electro-hydraulic controls (not shown). Fluid 37 drawn from a sump 35 by a fluid pump 33 may be used to provide the required line pressure within the transmission 14. A temperature sensor 38 may be used to measure the temperature of the fluid 37, and to communicate the measured temperature (arrow 39) to the controller 26, e.g., to enable the controller 26 to adjust gains in any PID logic used in execution of a subsequent shift event.

The example vehicle 10 of FIG. 1 may include an engine control unit (ECU) 29 as a separate device as shown or partially/fully integrated with the controller 26. In any embodiment, the controller 26 is in communication with the ECU 29 via a communication channel 21, e.g., a controller area network (CAN) bus, with the ECU 29 providing any required engine control values (arrow 11) to the engine 12 as needed. For instance, the controller 26 may request a specific level of engine torque from the ECU 29 during a given shift maneuver or state of the transmission 14, with the ECU 29 responding via any suitable means by increasing or reducing engine torque ($T_E$) as needed.

Figure 2:
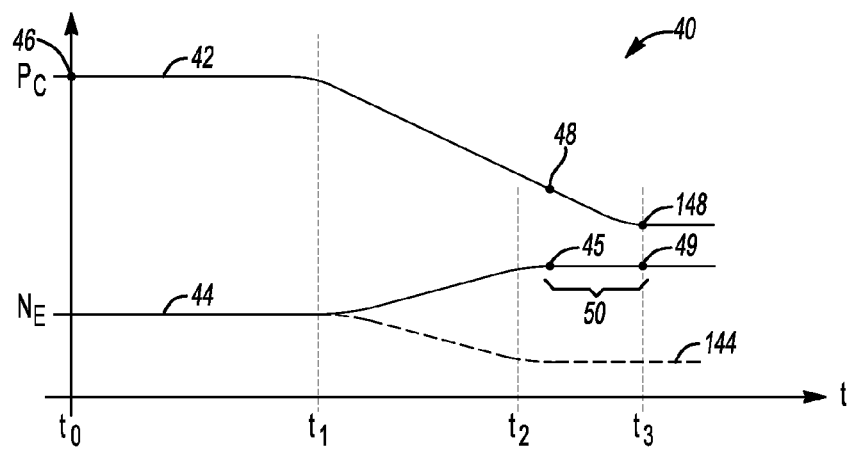
FIG. 2 is an example time plot of transmission control values for the vehicle shown in FIG. 1, with amplitude depicted on the vertical axis and time depicted on the horizontal axis.

Referring to FIG. 2, an example set of control values 40 is plotted versus time (t), with time (t) represented on the horizontal axis and the amplitude of the various control values 40 represented on the vertical axis. The control values 40 include clutch pressure ($P_C$) and engine speed ($N_E$), the latter of which may be reported to the controller 26 by the ECU 29 or measured at the turbine 34, as is well known in the art. The clutch pressure ($P_C$) is represented in FIG. 2 as trace 42, while engine speed ($N_E$) is represented in the same Figure as trace 44. The basic approach of method 100 may be described with reference to traces 42 and 44. A more detailed explanation of the present control approach is provided below with reference to FIG. 3.

With respect to the control values 40, prior to $t_0$ the vehicle 10 of FIG. 1 begins coasting. As an illustrative example, the vehicle 10 may be traveling at a speed of 70 mph when the driver encounters an extended downgrade and removes all applied pressure from an accelerator pedal. The vehicle 10 begins to coast. Clutch pressure ($P_C$) for a particular one of the clutches 17 of FIG. 1 is dropped to a level just above a calibrated or last-learned clutch pressure at $t_0$ to the level of point 46. This reduction in pressure results in a transmission state that is close to neutral, i.e., the coast-neutral state referred to herein.

A short time later, i.e., at $t_1$, which may be at least 1 second after $t_0$ in a particular embodiment, the controller 26 begins to ramp down clutch pressure to the selected clutch. This ramping approach may be seen in the slope of trace 42 between $t_1$ and $t_3$. In that same time period, if engine speed ($N_E$) remains above or below idle, i.e., about 600-800 RPM in a typical vehicle, engine speed begins to rise/fall to account for the change in clutch pressure. That is, clutch torque introduces a load on the engine 12 during coasting and the ramp trace 42 lessens the load.

Trace 144 shows another possible speed trajectory when engine speed ($N_E$) was held above idle when the coasting maneuver begins. In traces 44 and 144, engine speed ($N_E$) flattens out shortly after $t_2$, for instance beginning at point 45 in trace 44. Once engine speed ($N_E$) is stable, i.e., more or less unchanging within a calibrated tolerance, and engine torque ($T_E$) is stable as well, for a calibrated duration 50 defined by speed point 45 and a later speed point 49, the controller 26 may determine the return spring pressure using the pressure point of trace 42 occurring at the onset of such engine speed/torque stability, i.e., pressure point 48.

Because the duration 50 has elapsed to determine the engine speed stability precondition, a preliminary return spring pressure (pressure point 148) may be obtained at $t_3$. This value may not be the actual return spring value, and therefore the controller 26 may back-calculate the actual return spring pressure at pressure point 48, e.g., by extrapolating the clutch pressure ($P_C$) at pressure point 48 as a function of the preliminary return spring pressure (point 148) corresponding to speed point 49 of trace 44.

The present approach is based on the realization that engine torque will stabilize when clutch pressure ($P_C$) drops below return spring pressure. Before clutch pressure ($P_C$) reaches return spring pressure, the clutch torque for that clutch may be applying a torque to elevate engine speed ($N_E$) above idle, which then levels out, or clutch torque will pull down engine speed ($N_E$) below idle and elevate engine torque. Load on the engine 12, as determined by monitoring the changing engine speed ($N_E$), is thus a key to learning the clutch return spring pressure for a selected clutch.

Referring to FIG. 3 in conjunction with the structural elements of the vehicle 10 shown in FIG. 1, an example method 100 is shown for learning the return spring pressure of a selected one of the clutches 17. The method 100 begins at step 102, wherein the controller 26 determines whether suitable conditions exist for execution of the remainder of the method 100. Step 102 may entail measuring a torque request from a driver of the vehicle 10, engine speed ($N_E$), turbine speed ($N_T$), and/or output speed ($N_O$) of the transmission 14. Step 104 is subsequently executed only if coasting conditions are satisfied.

At step 104, the controller 26 selects a clutch from among the clutches 17 whose return spring pressure is to be learned. In a possible embodiment, the controller 26 may assign a different one of the counters 25 to a respective one of the clutches 17. As the controller 26 learns the return spring for a given one of the clutches 17, the controller 26, using the processor 20, may then increment the counter for that particular clutch. In this manner, selecting an appropriate clutch for return spring pressure analysis is a simple matter of selecting the clutch having the lowest counter value.

Alternately, each return spring learn event may be timestamped by the controller 26. As used herein, the term "time-stamped" means an assigned date and time of day. In such an embodiment, selecting a clutch for analysis from the plurality of clutches 17 may include selecting a clutch having the oldest recorded time-stamp. The time-stamp may also be used concurrently with the counter approach, such that clutches having the same counter value may be further differentiated by their time stamps. The controller 26 proceeds to step 106 once the clutch has been selected.

At step 106, the controller 26 drops the clutch pressure to just above the last known return spring pressure for the selected clutch. The target value in step 106 may be a calibration value when the vehicle 10 is first used, and later may be the recorded return spring pressure. "Just above" as used herein refers to a value falling within a calibrated range of the last known return spring pressure, e.g., +/−10% or +/−5% of that pressure. The controller 26 proceeds to step 108 when clutch pressure begins to decrease.

At step 108, the controller 26 determines whether a calibrated interval has elapsed, e.g., 100 ms, to account for any hydraulic delay in the fluid circuit feeding the clutches 17. If the calibrated interval has not elapsed, the controller 26 repeats step 108. The controller 26 proceeds to step 110 when the calibrated interval elapses.

At step 110, the controller 26 next determines a predicted engine/turbine speed. The controller 26 may use the output speed ($N_O$) of the transmission 14 and any allowable clutch combinations and/or calibrated lookup tables or maps in making this determination. The controller 26 then proceeds to step 112.

Still referring to FIG. 3, at step 112 the controller 26 of FIG. 1 determines whether actual turbine speed ($N_T$) and the predicted turbine speed from step 110 are above the engine idle speed. If so, the controller 26 proceeds to execute step 114. Otherwise, the controller 26 repeats step 110 until these conditions have been satisfied.

At step 114, the controller 26 continues ramping down clutch pressure. For instance, see FIG. 2, trace 42, beginning at about $t_1$ and continuing to $t_3$. The ramp-down rate may be a calibration value that is selected off-line when calibrating the controller 26. The controller 26 continues to step 116.

At step 116, the controller 26 determines whether engine speed ($N_E$) or turbine speed ($N_T$) is changing, i.e., increasing or decreasing. The controller 26 repeats step 114 when either condition is present. However, if engine speed has stabilized within an allowable rate of change, the controller 26 instead executes step 118.

At step 118, the controller 26 learns the return spring pressure for the selected clutch. Because engine speed (trace 44) must be stable for a sufficient duration in step 116, e.g., the duration between speed points 45 and 49, it may be necessary to extrapolate or back-calculate the actual clutch pressure at a pressure point 48 as noted above. Alternatively, the clutch pressure at pressure point 148 may be used as the return spring pressure. Once the learned return spring pressure at pressure point 48 has been recorded in memory 19, the controller 26 proceeds to step 120. Pressure may be determined, for instance, as a function of the ramp rate of clutch pressure ($P_C$) and the duration 50.

At step 120, the controller 26 may execute a suitable control action with respect to the transmission 14 of FIG. 1, e.g., in a subsequent shift event. For instance, the return spring pressure recorded at step 118 may be used as a control value in a future upshift or downshift event, such as to optimize fill control of an oncoming clutch and/or pressure control of an off-going clutch. Because the return spring pressure was learned during a coasting event that occurs near neutral, associated transient pressure control steps of the forgoing method 100 may be conducted by the controller 26 without being perceived by a driver of the vehicle 10. The present approach may conclude by adapting, as needed, various clutch fill and/or shift control commands to account for changes in the learned return spring pressure over time.

While the best modes for carrying out the invention have been described in detail, those familiar with the art to which this invention relates will recognize various alternative designs and embodiments for practicing the invention within the scope of the appended claims.

The invention claimed is:

1. A method of learning the return spring pressure of a clutch in an vehicle having an engine and an automatic transmission, the method comprising:
    detecting a predetermined coasting condition of the vehicle;
    selecting a clutch for analysis from a plurality of clutches of the transmission;
    ramping down clutch pressure to the selected clutch until engine speed reaches idle;
    measuring the clutch pressure for the selected clutch after engine speed has remained at idle for a calibrated duration;
    recording the clutch pressure in tangible, non-transitory memory of the controller as a preliminary return spring pressure;
    calculating the actual return spring pressure for the selected clutch as a function of the preliminary return spring pressure; and
    using the actual return spring pressure to control, via the controller, a subsequent shift event of the transmission.

2. The method of claim 1, wherein the vehicle includes a hydrodynamic torque converter having a turbine, the method further comprising:
    measuring a rotational speed of the turbine; and
    using the measured turbine speed as the engine speed.

3. The method of claim 1, wherein detecting a predetermined coasting condition includes waiting a calibrated interval after the vehicle begins coasting.

4. The method of claim 1, further comprising:
    assigning a counter value to each of the plurality of clutches; and
    incrementing a counter for a respective one of the clutches when the return spring pressure is learned for that particular clutch.

5. The method of claim 4, wherein selecting a clutch for analysis from the plurality of clutches includes selecting the clutch having the lowest counter value.

6. The method of claim 1, further comprising:
    recording a time-stamp to the learned return spring pressure that identifies the selected clutch;
    wherein selecting a clutch for analysis from the plurality of clutches includes selecting the clutch having the oldest recorded time-stamp.

7. The method of claim 1, wherein calculating the actual return spring pressure for the selected clutch includes calculating, as the function of the preliminary return spring pressure, the clutch pressure occurring at the beginning of the calibrated duration.

8. A vehicle comprising:
    an internal combustion engine operating at an engine speed;
    a transmission having an input member and a plurality of clutches, wherein the input member is connected to the engine; and
    a controller in communication with the clutches that includes a processor, a tangible, non-transitory memory device, and a set of computer-executable code recorded on the memory device, wherein the controller is configured to detect a predetermined coasting condition of the vehicle, and wherein execution of the code by the processor in response to the detected predetermined coasting condition causes the controller to:
    select a clutch for analysis from the plurality of clutches;
    ramp down clutch pressure to the selected clutch until the engine speed reaches a calibrated idling speed;

measure the clutch pressure for the selected clutch after the engine speed has remained at the calibrated idling speed for a calibrated duration;

record the clutch pressure onto the memory device as a preliminary return spring pressure;

calculate the actual return spring pressure for the selected clutch as a function of the preliminary return spring pressure; and use the actual return spring pressure to control a shift event of the transmission.

9. The vehicle of claim 8, further comprising a hydrodynamic torque converter having a turbine, wherein the controller determines a rotational speed of the turbine and uses the measured turbine speed as the engine speed.

10. The vehicle of claim 8, wherein the controller includes a timer, and is configured to detect the predetermined coasting condition in part by waiting a calibrated interval after the vehicle begins coasting.

11. The vehicle of claim 8, wherein the controller assigns a counter to each of the plurality of clutches, and increments the counter for a respective one of the clutches when the return spring pressure is learned for that particular clutch.

12. The vehicle of claim 11, wherein the controller selects a clutch for analysis from the plurality of clutches by selecting the clutch having the lowest counter value.

13. The vehicle of claim 8, wherein the controller records a time-stamp to the learned return spring pressure that identifies the selected clutch and selects a clutch for analysis from the plurality of clutches includes selecting the clutch having the oldest recorded time-stamp.

14. The vehicle of claim 8, wherein the controller calculates the actual return spring pressure for the selected clutch in part by calculating, as the function of the preliminary return spring pressure, the clutch pressure occurring at the earliest point in time in which the engine speed stabilized.

15. A system comprising:

a transmission having a plurality of clutches, wherein the transmission is connectable to an engine; and a controller in communication with the clutches that includes:

a processor; and a tangible, non-transitory memory device having a recorded set of computer-executable code;

wherein the controller is configured to detect a predetermined coasting condition of the vehicle, and to execute the code in response to the detected coasting condition, and wherein execution of the code causes the controller to:

select a clutch for analysis from the plurality of clutches;

ramp down clutch pressure to the selected clutch until an engine speed reaches a calibrated idling speed, wherein the engine speed is a speed of the engine;

measure the clutch pressure for the selected clutch after the engine speed has remained at the calibrated idling speed for a calibrated duration;

record the clutch pressure onto the memory device as a preliminary return spring pressure;

calculate the actual return spring pressure for the selected clutch as a function of the preliminary return spring pressure; and use the actual return spring pressure to control a shift event of the transmission.

16. The system of claim 15, wherein the controller includes a timer, and is configured to detect the predetermined coasting condition in part by waiting a calibrated interval after the vehicle begins coasting.

17. The system of claim 15, wherein the controller is configured to assign a counter to each of the plurality of clutches, and to increment the counter for a respective one of the clutches when the return spring pressure is learned for that particular clutch.

18. The system of claim 15, wherein the controller is configured to select a clutch for analysis from the plurality of clutches by selecting the clutch having the lowest counter value.

19. The system of claim 15, wherein the controller is configured to record a time-stamp to the learned return spring pressure that identifies the selected clutch, and select a clutch for analysis from the plurality of clutches by selecting the clutch having the oldest recorded time-stamp.

20. The system of claim 15, wherein the controller is configured to calculate the actual return spring pressure for the selected clutch in part by calculating, as the function of the preliminary return spring pressure, the clutch pressure occurring at the earliest point in time in which the engine speed stabilized.

* * * * *